(12) United States Patent
Lin et al.

(10) Patent No.: US 12,067,820 B2
(45) Date of Patent: Aug. 20, 2024

(54) CAR KEY PAIRING METHOD, CAR KEY, AND PAIRING SYSTEM

(71) Applicant: Fujian Maiwote Information Technology Co., Ltd., Fuzhou (CN)

(72) Inventors: Ling Lin, Fuzhou (CN); Guanghuan Jiang, Fuzhou (CN)

(73) Assignee: Fujian Maiwote Information Technology Co., Ltd., Fuzhou (CN)

( * ) Notice: Subject to any disclaimer, the term of this patent is extended or adjusted under 35 U.S.C. 154(b) by 68 days.

(21) Appl. No.: 18/174,586

(22) Filed: Feb. 24, 2023

(65) Prior Publication Data

US 2024/0221443 A1 Jul. 4, 2024

(30) Foreign Application Priority Data

Dec. 28, 2022 (CN) .......................... 202211706032.4

(51) Int. Cl.
*G07C 9/00* (2020.01)
*G05B 23/02* (2006.01)
*H04L 67/12* (2022.01)

(52) U.S. Cl.
CPC ..... *G07C 9/00309* (2013.01); *G05B 23/0213* (2013.01); *G07C 2009/00373* (2013.01); *H04L 67/12* (2013.01)

(58) Field of Classification Search
CPC ...... G07C 9/00309; G07C 2009/00373; G05B 23/0213; H04L 67/12
See application file for complete search history.

(56) References Cited

U.S. PATENT DOCUMENTS

2019/0392664 A1* 12/2019 Determann ........ G07C 9/00658
2021/0035390 A1* 2/2021 Determann ........ G07C 9/00857

* cited by examiner

*Primary Examiner* — Omeed Alizada

(57) ABSTRACT

A method for car key pairing includes docking, by the pairing module, with a corresponding interface on a car through the OBD interface, and obtaining power from the car to enable the processing chip to be powered on; transmitting, by the processing chip, an initialization instruction to the OBD interface by the OBD communication protocol of the preset car model, allowing data interaction between the processing chip and the car to be established; and transmitting, by the processing chip, the identification code of the car key to the OBD interface by the OBD communication protocol of the preset car model, allowing the data interaction and pairing between processing chip and the car.

9 Claims, 4 Drawing Sheets

The pairing module gains power from the car through the OBD interaface of the pairing module, and the processing chip is power one ~S101

After the pairing chip is powered on, the processing chip sends an initialization instruction to the OBD interface by the OBD communication protocol of the unique car model, allowing the processing chip to establish data interchange with the car ~S102

CAR KEY PAIRING METHOD, CAR KEY, AND PAIRING SYSTEM

FIELD OF THE DISCLOSURE

The disclosure relates to the technical field of cay key pairing, particularly to a car key pairing method, car key, and pairing system.

BACKGROUND OF THE DISCLOSURE

Car keys are devices used to lock and unlock cars, identified and decoded by an identifier code stored inside the car. There is a possibility for car keys to get lost, resulting in the need for pairing new keys to the car before unlocking it. Currently, a dedicated pairing device is required for pairing keys, with different car models needing different types of operations and the input of key identifiers. This makes the time and economic cost of pairing keys high for both car owners and vendors who offer these services. Thus, it is a very meaningful and practical topic to improve the convenience of car key pairing and reduce the time and economic costs.

SUMMARY OF THE DISCLOSURE

In view of this, the object of the present disclosure is to provide a car key pairing method, a car key and a pairing system that address the issue of bulky and expensive pairing devices that are inconvenient to use in the prior art.

The following solutions are used for the object of the present disclosure as mentioned above.

A method for car key pairing, wherein the car key includes an independent pairing module. The pairing module includes a processing chip, a memory connected to said processing chip, and an OBD interface. a OBD communication protocol of a preset car model, and an identification code of the car key are prestored in the memory; the pairing method including: docking, by the pairing module, with a corresponding interface on a car through the OBD interface, and obtaining power from the car to enable the processing chip to be powered on; transmitting, by the processing chip, an initialization instruction to the OBD interface by the OBD communication protocol of the preset car model, allowing data interaction between the processing chip and the car to be established; and transmitting, by the processing chip, the identification code of the car key to the OBD interface by the OBD communication protocol of the preset car model, allowing the data interaction and pairing between processing chip and the car.

In some embodiments, preferably, the OBD communication protocol of the car model stored in the memory of the present disclosure is a OBD communication protocol for unique car model.

In some embodiments, furthermore, the car key or pairing module of the present disclosure is provided with a model identification corresponding to the OBD communication protocol of the car model stored in the memory.

In some embodiments, preferably, the model identification is arranged on the car key or the pairing module of the present disclosure.

In some embodiments, the pairing method of the present disclosure further includes: after the car key pairing is completed, the processing chip sends a preset reminder message by driving a reminder unit.

In some embodiments, furthermore, the number of the car key of the present disclosure is one or multiple ones associated with each other; when the number of the car keys multiple ones associated with each other, the memory of the pairing module is prestored with the identification codes of the car keys, and the processing chip adopts the preset OBD communication protocol of the car model to send the identification codes of the car keys one by one to the OBD interface, so as to interact with the car data and complete the car key pairing.

Based on the above, the present disclosure further provides a car key, which includes an independent pairing module, the pairing module comprising a processing chip and a memory connected to the processing chip, an OBD interface, the power and communication pins of the OBD interface being connected to the power and communication pins of the processing chip, the memory being preloaded with the preset car model OBD communication protocol and also preloaded with the identification code of the car key, the pairing module being docked with the corresponding interface on the car via the OBD interface and obtaining power from the car, whereby the processing chip is powered up; when the processing chip is powered up, the preset car model OBD communication protocol is used to send initialization instructions to the O BD interface for data interaction; the processing chip also uses the preset car model OBD communication protocol to send the identification code of the car key to the OBD interface for data interaction, thereby completing the pairing of the car key.

In some embodiments, preferably, the OBD communication protocol of the car model stored in the memory of the present disclosure is a OBD communication protocol for unique car model.

In some embodiments, furthermore, the car key or pairing module of the present disclosure is provided with a model identification corresponding to the OBD communication protocol of the car model stored in the memory.

In some embodiments, preferably, the model identification is arranged on the car key or the pairing module.

In some embodiments, furthermore, the car key further comprises a reminder unit; after the car key pairing is completed, the processing chip sends a preset reminder message by driving the reminder unit.

In some embodiments, furthermore, the number of the car key in the present disclosure is one or multiple ones relative to each other; when he number of the car key is multiple ones relative to each other, the memory of the pairing module is prestored with the identification codes of the car keys, and the processing chip adopts the preset OBD communication protocol of the car model to send the identification codes of the car keys one by one to the OBD interface, so as to interact with the car data and complete the car key pairing.

In some embodiments, furthermore, the memory of the present disclosure is embedded within the processing chip; the car key also comprises a communication transceiver chip, a voltage conversion chip, a first circuit board, and a second circuit board. The power pin of the OBD interface is connected to the power pin of the processing chip by the voltage conversion chip. The communication pin of the OBD interface is connected to the communication pin of the processing chip through the communication transceiver chip. The communication transceiver chip is arranged on the first circuit board, which is welded with the pins of the OBD interface. The second circuit board is connected to the first circuit board via an interface connector. The processing chip is arranged on the second circuit board; wherein the interface connector is a needle, which is welded to the first circuit board and the second circuit board to support the first circuit board and the second circuit board; the second circuit board is provided with a reminder unit, and after the car key pairing is completed, the processing chip sends out a present reminder message by driving the reminder unit. Additionally, the car key also includes a protective shell, the protective shell being arranged on the top of the OBD interface. The first circuit board and the second circuit board are placed within the protective shell.

Based on the above, the present disclosure further provides a car key pairing system. The car key pairing system comprises a car key and a writing device, wherein the car key is described as above, and the writing device is configured for writing the identification code of the car key into the pairing module of the car key.

By adopting the above technical solution, compared with the prior art, the advantage of the present disclosure stores the preset OBD communication protocol of preset car models and the identification codes corresponding to the car keys in the memory of the car key, so that the processing chip pairs according to the communication protocol and preset programs to complete the car key pairing after the car key is connected with the car for powering on the processing chip through the ODB interface. The OBD communication protocol of the preset car model stored in the memory can be the only OBD communication protocol for one car model. In this form, self-service operation of the owner can be realized without the involvement of special car key pairing operators. The solution as provided is flexible and convenient, and the pairing module has simple structure, small size, and low cost.

BRIEF DESCRIPTION OF DRAWINGS

In order to explain the embodiments of the present invention or the technical solutions in the prior art more clearly, the following briefly introduces the accompanying drawings that need to be used in the description of the embodiments or the prior art. Obviously, the accompanying drawings in the following description are only These are some embodiments of the present invention. For those of ordinary skill in the art, other drawings can also be obtained according to these drawings without creative efforts.

DETAILED DESCRIPTION OF THE DISCLOSURE

Figure 1:
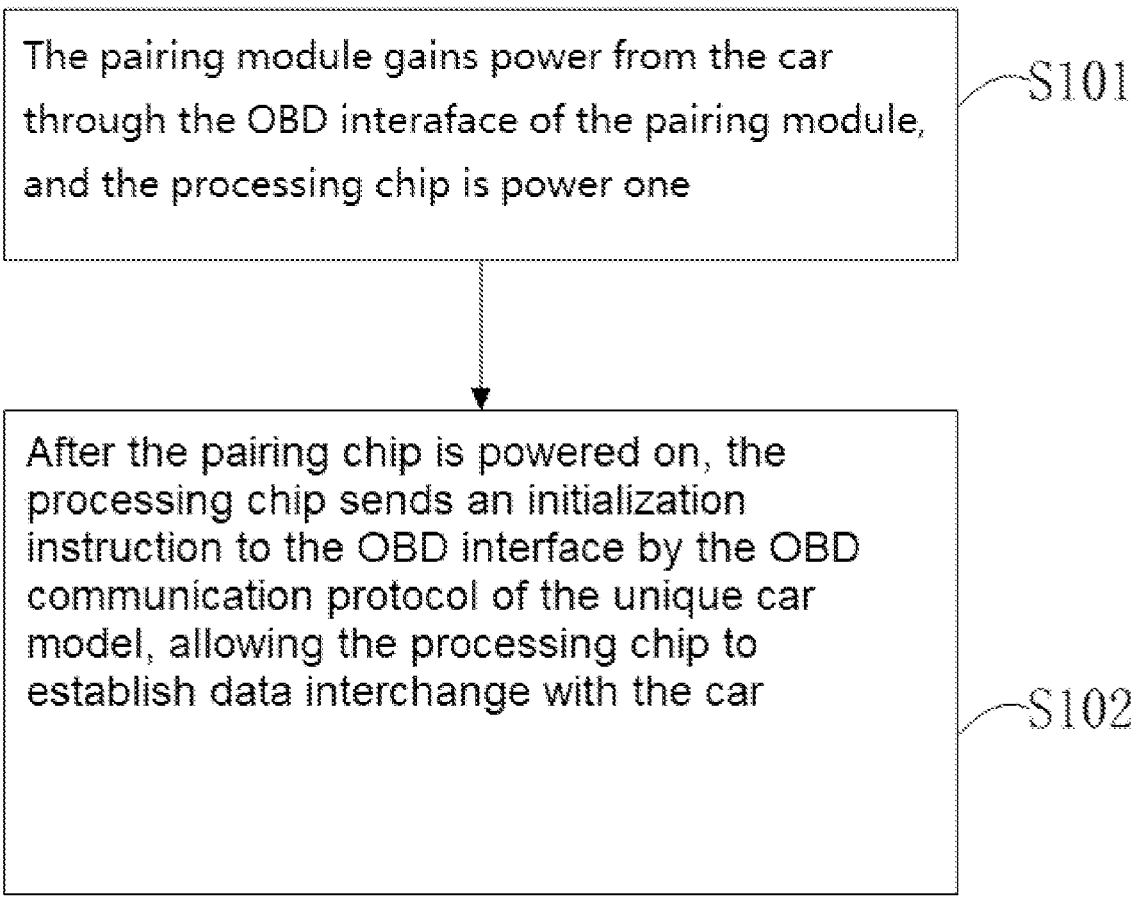
FIG. 1 is a flow diagram of the car key pairing method according to embodiments of the present disclosure.

The present invention will be further described in detail below with reference to the accompanying drawings and embodiments. It is particularly pointed out that the following examples are only used to illustrate the present invention, but do not limit the scope of the present invention. Likewise, the following embodiments are only some rather than all embodiments of the present invention, and all other embodiments obtained by those of ordinary skill in the art without creative work fall within the protection scope of the present invention.

Referred to FIG. 1 to FIG. 4, the present disclosure provides a car key pairing method. The car key includes an independent pairing module 1. The pairing module 1 includes a processing chip 10, a memory, and an OBD interface 11 (on board diagnostics, car automatic diagnosis system). The processing chip 10 is connected to the memory. The power and communication pins of the OBD interface 11 are connected to the power and communication pins of the processing chip 10. The memory is preloaded with a OBD communication protocol of a unique car model, and an identification code for the car key. The identification code is configured to identify the car key. The car key also stores the identification code, which can be triggered by pressing a button on the car key. For example, after the button on the car key is pressed, the car key will encrypt the identification code and a key command, and send the encrypted identification code and key command to the car via radio signals; after the car detects the radio signal, the car will parse the radio signal and compare the radio signal with the identification code on the car key; if the comparison result is consistent, the car will respond to the key command. Therefore, the critical for key pairing is to store the identification code of the car key into the car control system. In addition, the identification code can also be used for data interchange and transmission by the OBD interface 11.

In some embodiments, the pairing method of the present disclosure includes the following steps.

S101, the pairing module 1 gains power from the car through the OBD interface 11 on the pairing module 1, and the processing chip 10 is powered on.

S102, after the processing chip 10 is powered on, the processing chip 10 sends an initialization instruction to the OBD interface 11 by the OBD communication protocol of the unique car model, allowing the processing chip to establish data interchange with the car. The processing chip 10 sends the identification code of the car key to the OBD interface 11 by the OBD communication protocol of the unique car model, enabling the data interchange between the processing chip 10 and the car, and then the car key pairing is completed.

In the present disclosure, the OBD communication protocol of a unique car model is prestored in the memory. The processing chip 10 performs automated pairing according to the prestored communication protocol and preset programs after the processing chip 10 is powered on. During pairing, the pairing module 1 stores the identification code of the car key into the car. After the pairing is successful, the corresponding instructions are triggered by pressing the function buttons of the car key. The car can recognize the car key according to the stored identification code, and realize the unlocking, locking and other functions of the car key. During the pairing process, it is easy to use, and no professional personnel is involved. Moreover, the pairing module 1 has a simple structure, small size and low cost. Customers who need a car key do not need to learn how to operate the pairing module 1 for pairing, they only need to plug the pairing module 1 into the OBD of the corresponding model car to complete the pairing.

In some embodiments, in order to facilitate the identification of the car model corresponding to the car key, the car key or pairing module 1 is attached with the same car model identification as the car model in the OBD communication protocol of the unique car model. The car model identification may be the make and car model. For example, the brand is Volkswagen and the model is Lavida. In this way, the car model to which the pairing module 1 and the car key are aimed can be easily identified through the car model identification. The car model identification can be arranged on the car key and the pairing module 1, and can also be put on the bag that packs the car key and the pairing module 1. In this way, when in use, it is only necessary to insert the pairing module 1 into the corresponding car according to the model identification, and then the car key can be paired with the car. When manufacturing the pairing module 1, it is only necessary to write the programs of different car models into the memories of different pairing modules 1. The programs of different car models contain the unique OBD communication protocol corresponding to the car model, so the pairing module 1 stores the OBD communication protocol of the unique car model. In manufacturing, the identification code of the car key will be stored in the memory of this pairing module 1. When the customer needs to pair a car model, he only needs to select the pairing module 1 of the corresponding car model.

In some embodiments, the embodiment of the present disclosure also includes the steps of:

S103, the processing chip 10 drives the reminder unit to send a reminder message after the car key pairing is completed. The reminder message may be a reminder message sent by driving the reminder unit on the pairing module 1. The reminder unit may be a buzzer 18, an LED lamp, or the like. The pairing completion is realized through the reminder of the reminder unit.

In some embodiments, the number of the car keys may be two. The memory is prestored with identification codes of two car keys. After the processing chip 10 sends the identification code of a car key to the OBD interface 11, the processing chip 10 sends the identification code of another car key to the OBD interface 11 after adopting the OBD communication protocol of the unique car model. That is, the present disclosure can realize the pairing of two car keys, and complete the writing of two identification codes on one car. In this way, a car can be matched with two new keys. But the present disclosure is not limited to this. The number of the car keys may also be greater than two. When more than two car key are needed, the memory of the pairing module pre-stores the identification codes of the more than two car keys, and the processing chip uses the OBD communication protocol of the preset car model to send the identification codes of the car keys to the OBD interface 11 one by one, so that it can be connected with the car data interact to complete the car key pairing.

Figure 2:
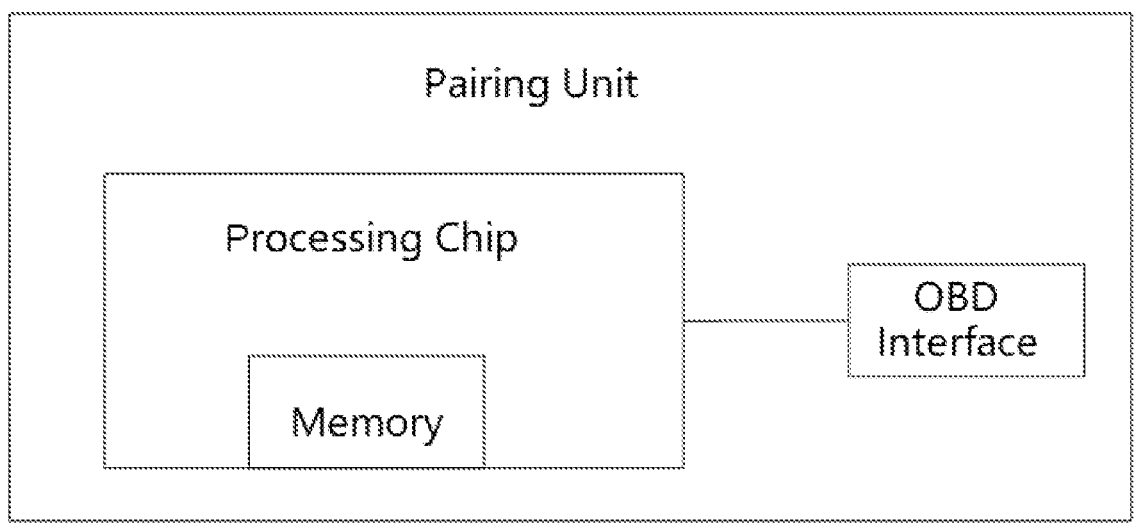
FIG. 2 is a schematic diagram of the car key pairing system according to embodiments of the present disclosure.
Figure 3:
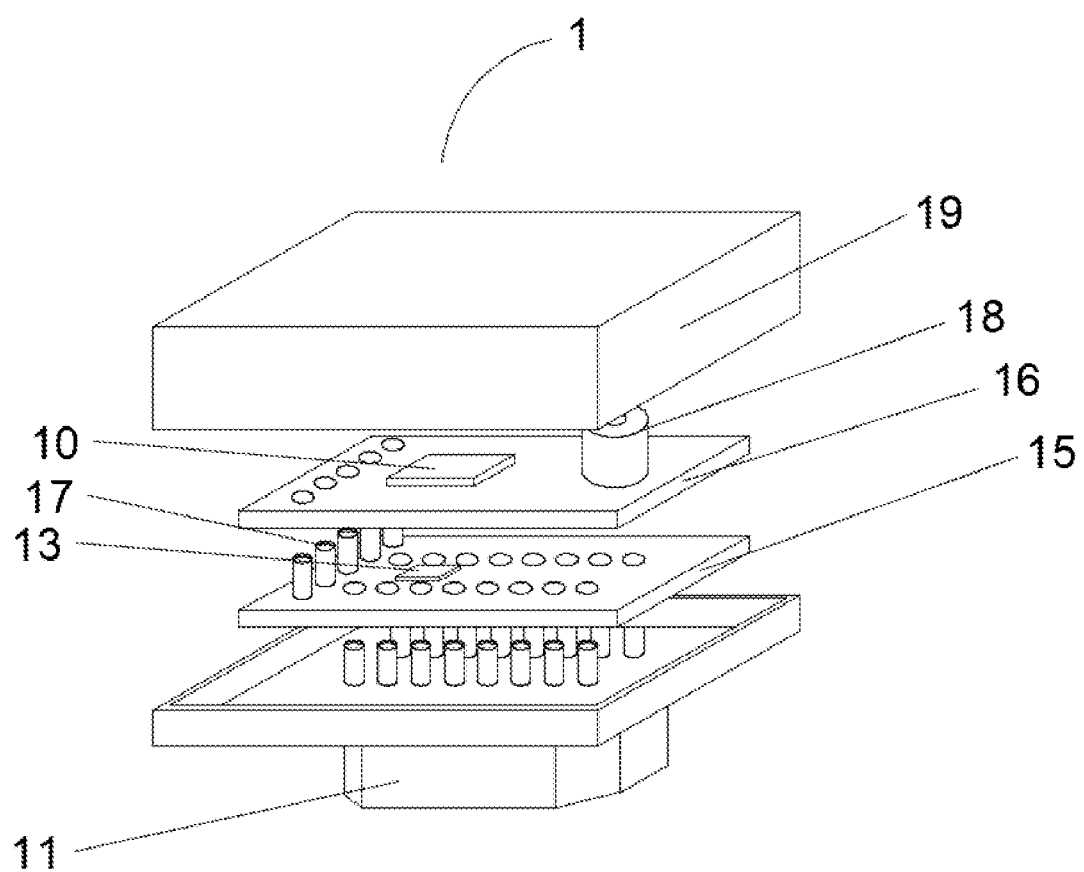
FIG. 3 is an exploded diagram of the pairing module according to embodiments of the present disclosure.
Figure 4:
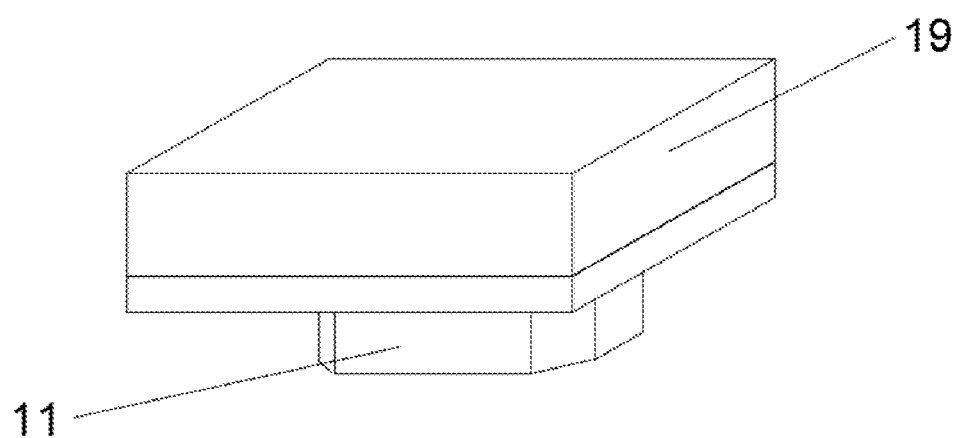
FIG. 4 is a schematic diagram of the assembled pairing module according to embodiments of the present disclosure.

As shown in FIG. 2 to FIG. 4, this embodiment also provides a hardware solution for a car key. The car key includes an independent pairing module 1. The pairing module 1 includes a processing chip 10, a memory and an OBD interface 11. The processing chip 10 is connected to the memory. The power and communication pins of the OBD interface 11 are connected to the power and communication pins of the processing chip 10. The memory pre-stores the OBD communication protocol of a unique car model and the identification code of the car key. The pairing module 1 obtains power from the car through the OBD interface 11 on the pairing module 1. The processing chip 10 starts up after receiving power. After the processing chip 10 is started, the OBD communication protocol of the unique car type is used to send an initialization command to the OBD interface 11. The identification code of the car key is sent to the OBD interface 11 to complete the car key pairing. The pairing process of the present invention does not require personnel to participate, and is convenient to use. Moreover, the pairing module 1 is simple in structure, small in size and low in cost. Customers who need a car key do not need to learn how to operate the pairing module 1 for pairing, and only need to insert the pairing module 1 into the OBD of the car of the corresponding model to complete the pairing.

In some embodiments, the car key or pairing module 1 attached with the same model identification as that of the car model in the OBD communication protocol of the unique car model. The car model identification may be the brand and model of the car. For example, the brand is Volkswagen, and the model is Lavida. In this way, the car model to which the pairing module 1 and the car key are aimed can be easily identified through the car model identification. The car model identification can be set on the car key and the pairing module 1, and can also be set on the bag that packs the car key and the pairing module 1. The different pairing modules 1 can be distinguished by the model identification, and the corresponding pairing module 1 can be selected according to the car model that needs to be equipped with a key.

In some embodiments, a reminder unit is also included. After the processing chip 10 completes the car key pairing, it drives the reminder unit to send out a reminder message. The reminder message may be transmitted by driving the reminder unit on the pairing module 1. The reminder unit may be a buzzer 18, an LED lamp, or the like. The reminder of pairing completion is realized through the reminder of the reminder unit.

In some embodiments, the number of the car keys is two. The memory is prestored with identification codes of two car keys. After the processing chip 10 sends the identification code of a car key to the OBD interface 11, the processing chip 10 sends the identification code of another car key to the OBD interface 11 after adopting the OBD communication protocol of the unique car model. That is, the solution of the present disclosure can realize the pairing of two car keys, and complete the writing of two identification codes on one car. In this way, a car can be matched with two new keys.

In some embodiments, the memory is disposed within the processing chip 10. In some embodiments, the memory may also be disposed in the processing chip 10. Because there is the OBD communication protocol of the unique car model in the memory of the car key, the program size is small, and the built-in memory of the processing chip 10 can be used to avoid additional external memory and save costs.

In some embodiments, the car key of this solution also includes a communication conversion chip 13 and a voltage conversion chip. The power pin of the OBD interface 11 is connected to the power pin of the processing chip 10 through a voltage conversion chip. The communication pin of the OBD interface 11 is connected to the communication pin of the processing chip 10 through the communication conversion chip 13. Through the communication conversion chip 13, the voltage of the communication pin on the OBD interface 11 can be reduced to the voltage of the communication pin of the processing chip 10, and the communication between the OBD interface 11 and the processing chip 10 can be realized. Then the voltage of the OBD interface 11 can be reduced through the voltage conversion chip. The reduced voltage is provided to the processing chip 10 for power supply.

In some embodiments, the car key of this solution further includes a first circuit board 15 and a second circuit board 16. The communication conversion chip 13 is arranged on the first circuit board 15. The first circuit board 15 is soldered to the pins of the OBD interface 11. The second circuit board 16 is connected to the first circuit board 15 through an interface connector 17. The processing chip 10 is disposed on the second circuit board 16. By stacking two circuit boards, a very compact structure can be achieved. The two circuit boards can be directly arranged on the back of the OBD interface 11, which has a simple structure and low cost. Then, the electronic components (including chips, capacitors, resistors and inductors, etc.) of the first circuit board 15 and the second circuit board 16 can be arranged on one side. That is, the mating module 1 can be completed by using a single-sided circuit board, which further reduces the cost.

In some embodiments, the interface connector 17 is a needle. The needle is welded on the first circuit board 15 and the second circuit board 16. The pins support the first circuit board 15 and the second circuit board 16. The electrical connection between the first circuit board 15 and the second circuit board 16 can be realized through the pins, and mechanical fixing can also be realized without additional fixing modules, thereby reducing costs.

In some embodiments, a reminder unit is provided on the second circuit board 16. The reminder message may be transmitted by driving the reminder unit on the pairing module 1. The reminder unit can be a buzzer 18, an LED lamp, or the like. The reminder of pairing completion is realized through the reminder of the reminder unit.

In some embodiments, the car key of the present disclosure further includes a protective shell 19. The protective shell 19 covers the top of the OBD interface 11. The first circuit board 15 and the second circuit board 16 are placed in the protective casing 19. The overall structure of the pairing module 1 is simple, and there are no buttons or other components that need to be operated by the user. The user does not need to learn how to operate, which greatly simplifies the user's operation.

Based on the above, the solution of this embodiment is also a car key pairing system. A car key pairing system includes a car key and a writing device. The car key is the car key described in any one of the embodiments of the present invention. The writing device is used for writing the identification code of the car key into the pairing module 1 of the car key. The writing device is the programming device of pairing module 1. The OBD communication protocol of the unique car can also be written into the pairing module 1 through the writing device, and the pairing module 1 can complete the communication and car key pairing with the corresponding car through the OBD communication protocol of the unique car model. It should be noted that the OBD communication protocol mentioned in the solution of the present disclosure refers to one of the OBD communication protocols. Alternatives, different car models may have the same OBD communication protocol, and these car models can be considered as one model or the same model.

The above descriptions are only some embodiments of the present invention, and are not intended to limit the protection scope of the present invention. Any equivalent device or equivalent process transformation made by using the contents of the description and drawings of the present invention, or directly or indirectly applied to other related technical fields, are similarly included in the scope of patent protection of the present invention.

What is claimed is:

1. A method for car key pairing, wherein the car key comprises an independent pairing module; the pairing module comprises a processing chip, a memory connected to said processing chip, and an OBD interface; a OBD communication protocol of a preset car model, and an identification code of the car key are prestored in the memory; the pairing method comprising:
   docking, by the pairing module, with a corresponding interface on a car through the OBD interface, and obtaining power from the car to enable the processing chip to be powered on;
   transmitting, by the processing chip, an initialization instruction to the OBD interface by the OBD communication protocol of the preset car model, allowing data interaction between the processing chip and the car to be established;
   transmitting, by the processing chip, the identification code of the car key to the OBD interface by the OBD communication protocol of the preset car model, allowing the data interaction and pairing between processing chip and the car; and
   wherein the memory is arranged within the processing chip; the car key further comprises a communication transceiver chip, a voltage conversion chip, a first circuit board, and a second circuit board; wherein a power pin of the OBD interface is connected to a power pin of the processing chip by the voltage conversion chip; and a communication pin of the OBD interface is connected to a communication pin of the processing chip through the communication transceiver chip; the communication transceiver chip is arranged on the first circuit board; the pins of the first circuit board and the OBD interface are welded together; the second circuit board is connected to the first circuit board via an interface connector; the processing chip is arranged on the second circuit board; wherein, the interface connector is a needle, which is welded to the first circuit board and the second circuit board to support the first circuit board and the second circuit board; the second circuit board is provided with the reminder unit; the processing chip transmits the preset reminder message by driving the reminder unit; the car key further comprises a protective shell; the protective shell is arranged on a top of the OBD interface; the first circuit board and the second circuit board are placed within the protective shell.

2. The method according to claim 1, wherein the OBD communication protocol of the car model stored in the memory is an OBD communication protocol for a unique car model;
   a car identification corresponding to the OBD protocol of the prestored car model in the memory is attached to the car key or the pairing module.

3. The method according to claim 1, wherein the method further comprises: after the car key pairing is completed, transmitting, by the processing chip, a preset reminder message by driving a reminder unit.

4. The method according to claim 1, wherein the number of the car key is one or multiple ones associated with each other; when the number car key is multiple ones associated with each other, the memory of the pairing module is prestored with the identification codes of the car keys, and the processing chip adopts the preset OBD communication protocol of the car model to send the identification codes of the car keys one by one to the OBD interface, so as to interact with car data and complete the car key pairing.

5. A car key, comprising an independent pairing module; the pairing module comprises a processing chip, a memory connected to the processing chip, an OBD interface;
   power and communication pins of the OBD interface are connected to power and communication pins of the processing chip;
   the memory is preloaded with a OBD communication protocol of a preset car model, and an identification code of the car key;

the pairing module is docked with the corresponding interface on the car through the OBD interface, and obtains power from the car, whereby the processing chip is powered up;

when the processing chip is powered up, an initialization instruction is transmitted to the OBD interface by the OBD communication protocol of the preset car model for data interaction;

the processing chip is further configured to transmit the identification code of the car key to the OBD interface by the OBD communication protocol of the preset car model for data interaction, thereby completing the pairing of the car key; and wherein the memory is arranged within the processing chip; the car key further comprises a communication transceiver chip, a voltage conversion chip, a first circuit board, and a second circuit board; wherein a power pin of the OBD interface is connected to a power pin of the processing chip by the voltage conversion chip; and a communication pin of the OBD interface is connected to a communication pin of the processing chip through the communication transceiver chip; the communication transceiver chip is arranged on the first circuit board; the pins of the first circuit board and the OBD interface are welded together; the second circuit board is connected to the first circuit board via an interface connector; the processing chip is arranged on the second circuit board; wherein, the interface connector is a needle, which is welded to the first circuit board and the second circuit board to support the first circuit board and the second circuit board; the second circuit board is provided with the reminder unit; the processing chip transmits the preset reminder message by driving the reminder unit; the car key further comprises a protective shell; the protective shell is arranged on a top of the OBD interface; the first circuit board and the second circuit board are placed within the protective shell.

6. The car key according to claim 5, wherein the OBD communication protocol of the car model stored in the memory is an OBD communication protocol for a unique car model;

a car identification corresponding to the OBD protocol of the preset car model in the memory is attached to the car key or the pairing module.

7. The car key according to claim 6, wherein the car key further comprises a reminder unit; a preset reminder message is transmitted by the processing chip driving the reminder unit.

8. The car key according to claim 6, wherein the number of the car key is one or multiple ones associated with each other; when the number car key is multiple ones associated with each other, the memory of the pairing module is prestored with the identification codes of the car keys, and the processing chip adopts the preset OBD communication protocol of the car model to send the identification codes of the car keys one by one to the OBD interface, so as to interact with car data and complete the car key pairing.

9. A car key pairing system, comprising a car key according to claim 5, and a writing device; the writing device is configured for writing an identification of the car key into the pairing module of the car key.

* * * * *